BROAD-BAND COUPLED CAVITY SLOW-WAVE STRUCTURE

Original Filed Dec. 27, 1967 3 Sheets-Sheet 1

INVENTORS
TOHRU MATSUOKA
TOSHINOR HORIGOME
BY Hopgood & Calimafde
ATTORNEYS

BROAD-BAND COUPLED CAVITY SLOW-WAVE STRUCTURE

Original Filed Dec. 27, 1967 3 Sheets-Sheet 2

INVENTORS
TOHRU MATSUOKA
TOSHINOR HORIGOME

BY Hopgood & Calimafde
ATTORNEYS

BOARD-BAND COUPLED CAVITY SLOW-WAVE STRUCTURE

Original Filed Dec. 27, 1967 3 Sheets-Sheet 3

INVENTORS
TOHRU MATSUOKA
TOSHINOR HORIGOME

BY Hopgood & Calimafde
ATTORNEYS

United States Patent Office

Re. 27,708
Reissued July 24, 1973

27,708
BROAD-BAND COUPLED CAVITY SLOW-WAVE STRUCTURE

Tohru Matsuoka and Toshinori Horigome, Tokyo, Japan, assignors to Nippon Electric Co., Limited, Tokyo, Japan Original No. 3,517,347, dated June 23, 1970, Ser. No. 693,775, Dec. 27, 1967. Application for reissue Dec. 22, 1971, Ser. No. 210,797
Claims priority, application Japan, Dec. 29, 1966, 42/986
Int. Cl. H03h *7/30*
U.S. Cl. 333—31 R 3 Claims

Matter enclosed in heavy brackets [ ] appears in the original patent but forms no part of this reissue specification; matter printed in italics indicates the additions made by reissue.

ABSTRACT OF THE DISCLOSURE

A broad band coupled cavity slow-wave structure of the backward wave type having a plurality of successively arranged cavities formed by separating partition walls in which a short-circuit conductor is provided along the longitudinal axis of the structure to short circuit the partition walls in sequence.

BACKGROUND OF THE INVENTION

In general, a slow-wave structure of the coupled cavity type has a construction comprising a plurality of cavities arranged successively and partition walls dividing respective neighboring cavities, each of these partition walls being provided with an aperture for passing an electron beam and a means for coupling electromagnetic fields between the neighboring cavities.

The slow-wave structures of this type are classified into two types according to differences in number and arrangement of the means for coupling the electromagnetic fields between neighboring cavities. These are the forward wave type and the backward wave type, depending on whether the fundamental wave component of a wave propagating in the slow-wave structure has a forward phase velocity or a backward phase velocity. Concerning the voltage applied to the slow-wave structure, the forward wave type structure is usually operated by a pulse wave, while the backward wave type structure is operated by a continuous wave.

The conventional coupled cavity slow-wave structure, when employed in a travelling-wave tube, has the advantage of very high output power, but also has the serious disadvantage of narrow pass bandwidth. The prior art arrangements used for broadening the pass bandwidth are to increase the dimension of the means used for coupling the electromagnetic fields between neighboring cavities or to combine two types of coupling means. One arrangement is to widen the area of a coupling slot which serves as the coupling means, another is to enlarge the dimension of a coupling loop which also serves as the coupling means, and still another is a combination of a coupling slot and a coupling loop as disclosed in Japanese patent application No. 75,957/1965.

It is generally known that when one of these prior art arrangements is applied to a slow-wave structure of the backward wave type, and this broad-band slow-wave struture is employed in a travelling-wave tube, the efficiency of the tube decreases because part of the coupling between neighboring cavities changes from inductive to capacitive with an increase in the pass bandwidth and then the coupling impedance of the slow-wave structure becomes lower. In short, the conventional backward wave type slow-wave structure has an inherent limitation when broadening the bandwidth, because it is not possible to broaden the bandwidth without sacrificing the efficiency of the tube. Furthermore, in a slow-wave structure having a coupling slot as the coupling means, it happens that the resonant frequency of the coupling slot, which is called the slot mode, falls with an enlargement in the coupling slot and then approaches the value of the resonant frequency of the cavity. The proximity of the values of both these frequencies produces disadvantages in the travelling-wave tube, one of which is an undesirable oscillation of the travelling-wave tube, Therefore, it is not desirable to merely enlarge the coupling slot; in other words, it is not possible to obtain a sufficiently broad pass bandwidth by a change in the dimension of the coupling slot alone.

OBJECTS OF THE INVENTION

One object of the present invention is to provide a slow-wave structure of the backward wave type which is capable of broadening the pass bandwidth while maintaining the high coupling impedance of the structure.

Another object of the invention is to provide a slow-wave structure of the backward wave type which is capable of broadening the pass bandwidth when employed in a travelling-wave tube, while maintaining the high efficiency of the tube.

Still another object of the invention is to provide a slow-wave structure of the backward wave type which is capable of broadening the pass bandwidth without lowering the resonant frequency due to the slot mode.

Yet another object is to provide a slow-wave structure of the backward wave type having much wider pass bandwidth than conventional slow-wave structures which have limitations when broadening the pass bandwidth.

It is a further object of the invention to provide a slow-wave structure of the backward wave type having superior heat radiation.

All of the objects, features and advantages of this invention and the manner of attaining them will become more apparent and the invention itself will be best understood by reference to the following description of the invention taken in conjunction with the accompanying drawing.

BRIEF DESCRIPTION OF THE DRAWING

FIG. 2b is a section of the structure of FIG. 2a,

FIG. 3b is a section of the structure of FIG. 3a,

FIG. 5b is a section of the structure of FIG. 5a,

SUMMARY OF THE NVENTION

According to the invention, a slow-wave structure is obtained wherein each of the partition walls. which divide neighboring cavities of a plurality of successively arranged cavities in the coupled cavity slow-wave structure of the backward wave type, is short-circuited alternately in sequence by means of a short-circuit conductor made of a conductive material.

The slow-wave structure according to this invention makes the apparent resonant frequency of the cavity higher than as it actually is, when operating near the 0 mode, because the equivalent value of the cavity is reduced by leading a wall current which flows along a partition wall toward an opposite surface of the next partition wall, by means of the short-circuit conductor. The pass bandwidth can be broadened in accordance with the degree of increase in the resonant frequency. Furthermore, since the short-circuit conductor causes the inductance of the cavity to increase, the lowering of the impedance resulting from the broadening of the bandwidth is compensated for and the coupling impedance of the slow-wave structure is maintained at a high level with little lowering thereof. Accordingly, when the slow-wave structure of this invention is employed in a travelling-wave tube, the pass bandwidth of the tube is broadened considerably, and yet the tube is maintained at a high efficiency.

DESCRIPTION OF THE PREFERRED EMBODIMENTS

Figure 1A:
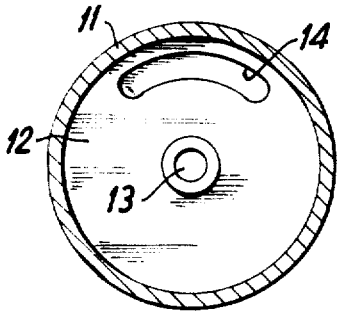
FIG. 1a is an end view of one example of a conventional coupled cavity slow-wave structure.
Figure 1B:
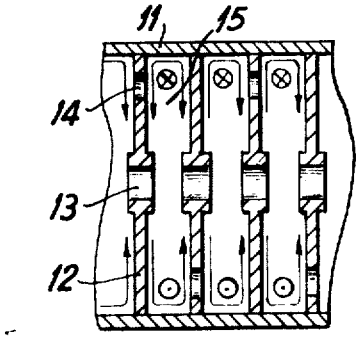
FIGS. 1b and 1c indicate conditions of operation in the 0 and $\pi$ modes, respectively.
Figure 1C:
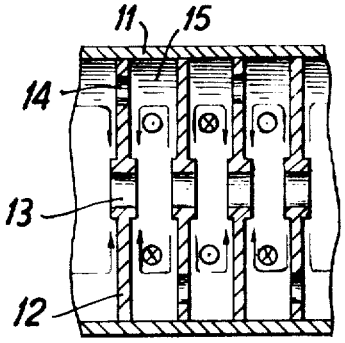

Referring now to FIGS. 1a–1c one example of a conventional coupled cavity slow-wave structure is so constructed that metal discs or partition walls 12 are fitted tightly into a metallic circumferential wall 11 of a cylindrical waveguide in perpendicular relation to the center axis of the guide. Each of these partition walls 12 of symmetrical shape is provided with an aperture 13 at its center for passing an electron beam and is also provided with a kidney shaped coupling slot 14 for coupling electromagetic fields. The partition walls 12 are arranged periodically within the circumferential wall 11 by rotating the symmetrical axis by 180° in sequence, thereby forming a plurality of spaced cavities 15. As will be appreciated from FIG. 1b, when this conventional slow-wave structure is operating near the 0 mode, each of the cavities 15 exhibits an electromagnetic field distribution of the same sense. The electric currents and the magnetic fields in each of the cavities are in the same sense over all of the cavities 15. Therefore, on both sides of a coupling slot 14, the currents are in opposite senses and the magnetic fields are in the same sense, and consequently the current path is not obstructed by the coupling slot 14 and also the magnetic fields on both sides do not cancel each other. As a result, the resonant frequency of the cavity indicates the actual resonant frequency thereof. In FIG. 1b and in each figure to be described, the sense of the current is indicated by the arrows, while that of electromagnetic field is indicated by the symbols ⊗ and ⊙.

However, as indicated by FIG. 1c, when this conventional slow-wave structure is operating near the $\pi$ mode, the electromagnetic field distribution in each cavity is inverted in sequence. The electric currents are in the same sense and the magnetic fields are in opposite senses on both sides of a coupling slot 14, and therefore the current flowing along a partition wall 12, i.e., the wall current, will flow away from the coupling slot 14 and also the magnetic fields cancel each other. This means a longer electric current path on the partition wall 12 and consequently results in an increase of the equivalent inductance and a decrease of the resonant frequency, the latter being expressed by $$f=\tfrac{1}{2}\pi\sqrt{LC}$$

As mentioned above, the pass bandwidth of the conventional slow-wave structure is based on the difference in frequency value between the resonant frequency of the cavity in the 0 mode and the lower resonant frequency in the $\pi$ mode.

Figure 2A:
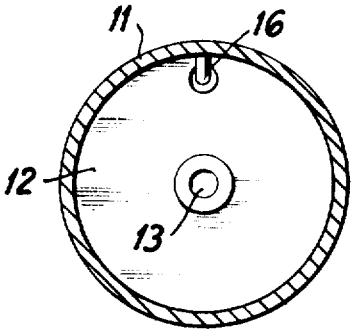
FIG. 2a is an end view of another example of a conventional slow-wave structure.
Figure 2B:
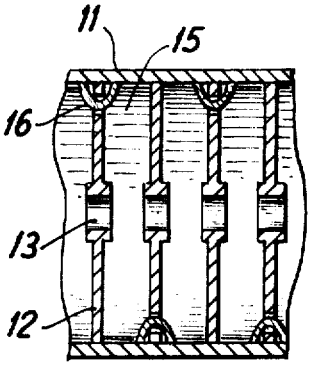

Referring next to FIGS. 2a and 2b, another example of a conventional coupled cavity slow-wave structure is shown wherein each of the partition walls 12 arranged within the circumferential wall 11 is a symmetrical shape provided with an aperture 13 at its center for passing an electron beam and also provided with a loop 16 near the circumference for coupling the electromagnetic fields. A plurality of cavities 15 are formed by periodically arranging the partition walls 12 within the circumferential wall 11 through sequential rotation of the symmetrical axis by 180°. The loops 16 for coupling the electromagnetic fields seen in FIGS. 2a and 2b, are U-shaped and pass through the partition wall 12 with both ends thereof being fixed on the circumferential wall 11. The loops 16 may also be circular, elliptical or S-shaped and pass through the partition wall with the ends thereof being fixed on both sides of said wall.

The conventional slow-wave structure of FIGS. 2a and 2b, when operating in the 0 mode and in the $\pi$ mode, will operate almost identical to that of the conventional slow-wave structure of FIGS. 1a–1c, its pass bandwidth being almost the same or rather narrow, and by increasing the number of loops 16, it is possible to approximate the bandwidth of the slow-wave structure of FIGS. 1a–1c.

Figure 3A:
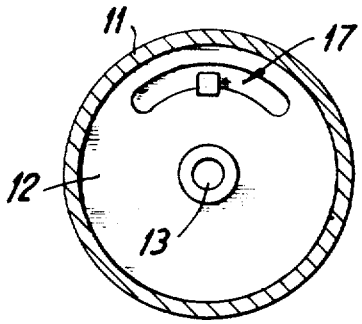
FIG. 3a is an end view of still another conventional structure.
Figure 3B:
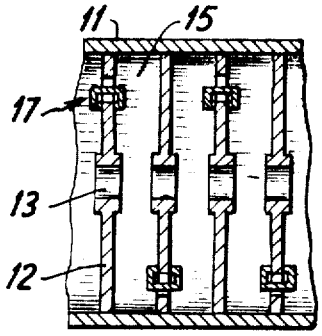

FIGS. 3a and 3b show another example of a conventional coupled cavity slow-wave structure, the same being disclosed in the specification of Japanese patent application No. 95,957/1965. In this structure, each of the partition walls 12, periodically arranged within the circumferential wall 11, is a symmetrical shape provided with a central aperture 13 and a combination 17 of a coupling slot and a coupling loop, and a plurality of cavities 15 are formed by arranging the partition walls 12 within the circumferential wall 11 by rotating the symmetrical axis by 180° in sequence.

The slow-wave structure having the construction shown in FIGS. 3a and 3b, when operating near the 0 mode, will exhibit almost the same resonant frequency as in the case of the conventional slow-wave structure of FIGS. 1a–1c or FIGS. 2a–2b, but when it is operating near the $\pi$ mode, it has a large increase in equivalent inductance, because coupling slot-coupling loop combination 17 has a large coupling effect which is the sum of the coupling effect of the coupling slot and that of the coupling loop, and therefore exhibits a considerably lower resonant frequency when compared with the case of the conventional slow-wave structure shown in FIGS. 1a–1c or FIGS. 2a–2c. Consequently, the pass bandwidth of the slow-wave structure of FIGS. 3a–3b can be made considerably broader when compared with the cases of the slow-wave structure shown in FIGS. 1a–1c and FIGS. 2a–2b.

As mentioned above, each of the conventional coupled cavity slow-wave structures has a pass bandwidth based on the frequency difference between the resonant frequency of the cavity operating near the 0 mode and a lower resonant frequency operating near the $\pi$ mode. The pass bandwidth, however, has such a nature that the coupling impedance of the slow-wave structure lowers with an increase in the value of the pass bandwidth and therefore has a limitation in broadening the value.

Figure 4A:
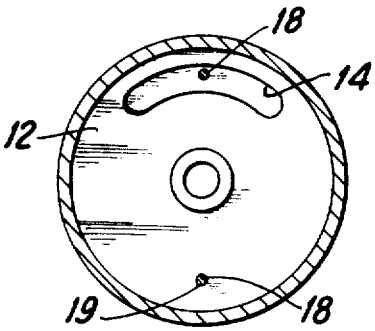
FIG. 4a shows an end view of a first embodiment of this invention.
Figure 4B:
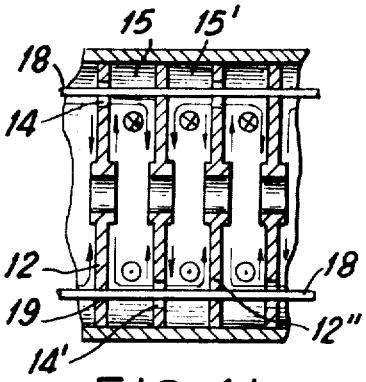
FIGS. 4b and 4c indicate conditions of operation in the 0 and $\pi$ modes, respectively.
Figure 4C:
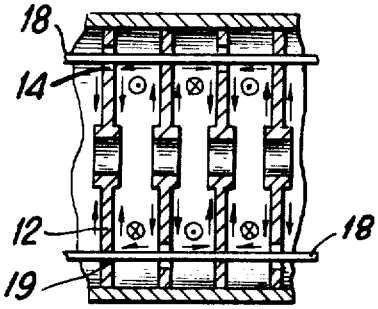

Reference is now made to FIGS. 4a–4c, which illustrate a first embodiment of this invention. The construction of this first embodiment is of the general type of coupled cavity slow-wave structure shown in FIG. 1, but having two straight rod-shaped short-circuit conductors or short-circuit rods 18 disposed through the whole length of the structure in symmetrical and parallel relationship with respect to the center axis of the structure; each partition wall 12 is provided with a small hole 19 fitted to the rod 18, and the short-circuit rods 18 pass through the small holes 19 and the coupling arcuate slots 14, alternately, thereby allowing the short-circuit rods 18 to short-circuit the partition walls 12 alternately in sequence. Here, it is desirable to arrange the short-circuit rods 18 on the symmetrical axis of the partition walls 12.

As indicated by FIG. 4b, when this slow-wave structure is operating near the 0 mode, each cavity will exhibit an electromagnetic distribution of the same sense as mentioned above, and therefore, the wall current along one of the partition walls of each cavity is lead to the neighboring cavity by the short-circuit rod and flows into the other partition wall of said neighboring cavity after passing through the coupling slot of the partition wall which divides the two cavities. For instance, a current along a parition wall 12 of a cavity 15 enters into the neighboring cavity 15' after passing through the coupling slot 14' along the short-circuit rod 18 and flows along the partition wall 12'' of said cavity 15'. The fact that wall currents of the neighboring cavities are short-circuited by means of the short-circuit rod corresponds to the case wherein the diameter of the cavity is made smaller than the actual diameter and becomes the same length as the distance of the short-circuit rods, when considering the resonant frequency. Accordingly, the slow-wave structure of this invention exhibits a resonant frequency equivalent to a cavity having a diameter equal to the distance between the short-circuit rods, which is a considerably higher frequency than the actual resonant frequency of the cavity of a conventional structure.

On the other hand, when the slow-wave structure according to this invention is operating near the $\pi$ mode, as indicated in FIG. 4c, the electromagnetic field distribution of each cavity 15 is inverted in sequence and consequently electric currents induced in the short-circuit rods 18 are in opposite senses and cancel each other and therefore there is no net flow. Accordingly, since the short-circuit rods 18 do not affect the resonance of the cavity, the slow-wave structure will exhibit a frequency of substantially the same value as the lower resonant frequency in the case of the conventional $\pi$ mode operation.

As is clear from the above description, the pass bandwidth of the slow-wave structure of this invention is broadened by the value corresponding to the degree of increase in the resonant frequency in the 0 mode when compared with that of the conventional structure. Furthermore, since the short-circuit rods 18 serve as inductances to be added to the cavity, it is expected to raise the coupling impedance of the cavity, which is expressed by $\sqrt{L/C}$. Consequently, according to the present invention, a slow-wave structure is obtained which is capable of maintaining its impedance at a high level for the wide bandwidth. In other words, a slow-wave structure is obtained having a wider bandwidth and a higher impedance compared to the conventional broad-band slow-wave structure. Accordingly, when the slow-wave structure of this invention is applied to a travelling-wave tube, a tube is obtained which permits broadening its bandwidth while maintaining its high efficiency. In other words, a travelling-wave tube is obtained which is capable of having broader bandwidth as well as having much higher efficiency when compared with a travelling-wave tube which employs a conventional slow-wave structure. Furthermore, according to the present invention, as it is not necessary to change the size of the coupling slot, it is possible to broaden a pass bandwidth without lowering the resonant frequency due to the slot mode.

An explanation will now be given of modifications of the first embodiment of this invention shown in FIGS. 4a–4c, wherein each partition wall is provided with a number of coupling slots.

First, let us consider a case wherein each partition wall is provided with two coupling slots in symmetrical relation with respect to its center. The partition walls are periodically arranged within the circumferential wall as they are rotated by 90° in sequence, and four short-circuit rods are used, which are arranged to pass through all the coupling slots by shifting their positions by 90° with respect to each other. Next, when each partition wall is provided with three coupling slots which are positioned at intervals of a 120° center angle, the parition walls are arranged thorugh rotation by 60° in sequence, and six short-circuit rods are disposed at intervals of 60° with each other in order to pass through all the coupling slots.

Figure 5A:
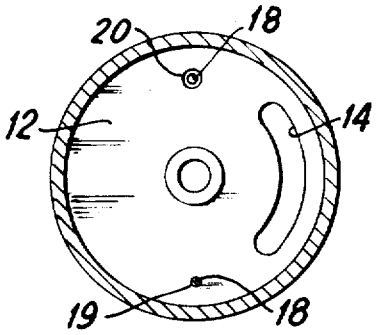
FIG. 5a is an end view of a second embodiment of this invention.
Figure 5B:
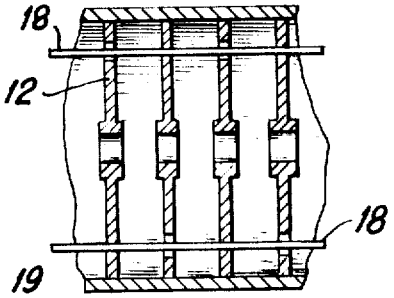

Referring now to FIGS. 5a and 5b, the second embodiment of this invention is a modification of the first embodiment, and has a construction such that each short-circuit rod 18 passes through a hole 20 which is made specifically to accommodate such rod, instead of passing through the coupling slot 14. The hole 20 is made to have a sufficiently larger diameter than that of the short-circuit rod so that the partition wall 12 does not contact the short-circuit rod. The short-circuit rods may be arranged in any of several different locations so long as they are symmetrical with respect to the center axis of the structure.

When the slow-wave structure of FIGS. 5a–5b is operating near the 0 and $\pi$ modes, respectively, it exhibits similar electromagnetic field distribution to that of the first embodiment of this invention shown in FIGS. 4a–4c, and therefore has a broad pass bandwidth and high coupling impedance.

Figure 6A:
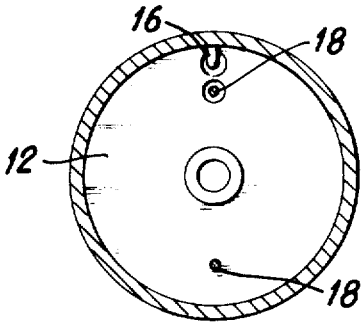
FIG. 6a is an end view of a third embodiment of this invention.
Figure 6B:
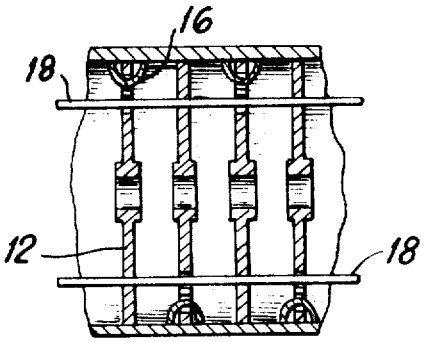
FIG. 6b is a section of the third embodiment structure.

Referring now to FIGS. 6a and 6b, a third embodiment of this invention is shown which utilizes the basic construction of the conventional slow-wave structure of FIG. 2 and in which two short-circuit rods 18 are arranged in parallel and symmetrical relationship with respect to the center axis of the structure, whereby the partition walls 12 are short-circuited alternately in sequence.

When this slow-wave structure is operating near the 0 mode, similar to the case of the first embodiment of this invention, a current along one partition wall of a cavity passes through the parition wall bounded by a neighboring cavity by means of the short-circuit rod and flows into the other partition wall of the neighboring cavity, a consequently its resonant frequency becomes higher. On the other hand, when this slow-wave structure is operating near the $\pi$ mode, the resonant frequency will not be affected by the short-circuit rods. Accordingly, the slow-wave structure of the third embodiment of this invention also has a broad bandwidth and high coupling impedance.

The short-circuit rods 18 can be located at any position besides the position on the symmetrical axis of the partition walls 12 as shown in FIGS. 6a and 6b, if they are arranged in symmetrical positions with respect to the center axis of the structure.

The third embodiment may be modified to include a number of coupling loops 16 in one partition wall, and there is no limitation in the number of short-circuit rods and in their positions, if they are arranged in parallel and at the same intervals with respect to the center axis of the structure. However, it is desirable that the number of the rods be an even number.

Figure 7A:
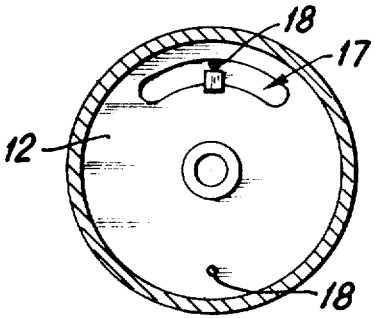
FIG. 7a is an end view of a fourth embodiment of this invention.
Figure 7B:
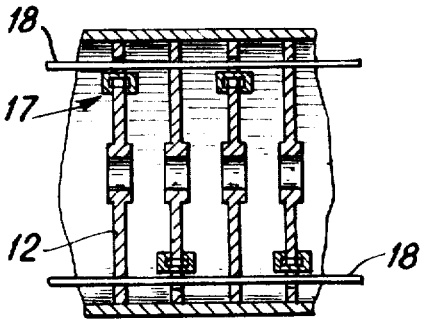
FIG. 7b is a section of the fourth embodiment structure.

Referring now to FIGS. 7a and 7b, a fourth embodiment of the invention is shown utilizing the basic structure of FIG. 3, and in which two short-circuit rods 18 are arranged to pass through each combination 17 of a coupling slot and a coupling loop in the partition walls 12, this structure also having a broad bandwidth and high coupling impedance similar to the cases of the above described first, second and third embodiments.

In this fourth embodiment, it is necessary that the short-circuit rods are so arranged that they are not in contact with the coupling slot or the coupling loop and also that they are arranged to the outer side of the coupling loops, i.e., toward the side of the circumferential wall 11. This is based on the consideration that the coupling effect due to the coupling loop is not decreased. Under this consideration, it is desirable that the form of the combination 17 of the coupling slot and the coupling loop be such that the coupling loop is fitted on the inner side of the coupling slot, i.e., on the side toward the central axis.

An explanation will now be given of a modification of the fourth embodiment. Each partition wall 12 may be provided with a number of the coupling combinations 17, each partition wall being so arranged that the coupling combination 17 of any partition wall does not correspond to the coupling combination of the neighboring partition wall. For instance, when two coupling combinations 17 are provided at intervals of 180°, each consecutive partition wall is arranged by rotating the same 90° in sequence, when three coupling combinations 17 are provided at intervals of 120°, each consecutive partition wall is arranged by rotating the same 60° in sequence, and the short-circuit rods 18, which are two times as many as the number of the coupling combinations 17, are arranged to pass through all the coupling combinations.

As a further modification of the fourth embodiment, the short-circuit rods may be arranged to pass through holes specifically provided in a partition wall instead of through the coupling slots which form part of the coupling combinations 17. In this case, however, the short-circuit rods are desirably located on a diameter of the partition wall when one partition wall is provided with one coupling combination 17. When a number of coupling combinations 17 are provided, each partition wall is so arranged that all the coupling combinations 17 are in the same direction throughout the whole slow-wave structure, and the same number of short-circuit rods 18 as the number of the coupling combinations 17 are arranged to pass through the partition walls alternately.

Figure 8:
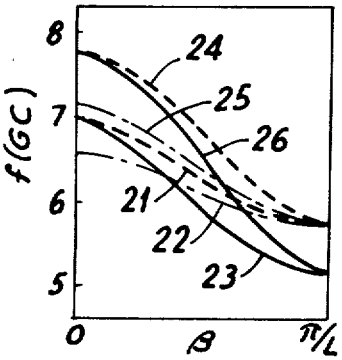
FIG. 8 is a graph showing Brilliouin diagrams of coupled cavity slow-wave structures according to this invention and of conventional slow-wave structures of this type.

FIG. 8 shows a Brillouin diagram wherein the phase constant $\beta$ is plotted along the abscissa and frequency f is plotted along the ordinate, on arbitrary scales, and from this diagram it is apparent that any one of the slow-wave structure according to the present invention has a considerably broader bandwidth compared with the conventional slow-wave structures. By comparing the six characteristic curves, i.e., curve 21 of the conventional slow-wave structure of FIG. 1, curve 22 of the conventional slow-wave structure of FIG. 2, curve 23 of the conventional slow-wave structure of FIG. 3, curve 24 of the slow-wave structure in the first or the second embodiment of the inveniton shown in FIGS. 4a–4c or FIGS. 5a–5b, curve 25 of the slow-wave structure in the third embodiment shown in FIG. 6, and curve 26 of the slow-wave structure in the fourth embodiment shown in FIG. 7, it is clear that each of the characteristic curves 24, 25 and 26 of the slow-wave structures of the present invention indicates a far larger value than the conventional cases 21, 22 and 23 in the 0 mode, although said characteristic values are almost the same as the characteristic values of the conventional slow-wave structures in the $\pi$ mode.

These advantages will now be explained with reference to experiments which have been conducted on both the prior art structures and the structures of this invention.

(I) The conventional slow-wave structure shown in FIG. 1

The slow-wave structure used in this experiment has a construction such that each cavity 15 is formed in a cylindrical waveguide having a 30 mm. inner diameter by arranging partition walls 12 of a dioxidized copper plate of 1 mm. thickness at intervals of 8 mm., each partition wall 12 being provided with a center aperture 13 of 4 mm. diameter, a kidney shaped coupling slot 14 of 6 mm. width and having a central angle of 75° made by both ends thereof with the center point, and a ring-shaped protrusion of 1 mm. width which extends on both sides by 2 mm. from the circumference of the central aperture 13 in the axial direction of the structure. The conventional slow-wave structure having such construction exhibits a resonant frequency of 7000 mc. in the 0 mode and a resonant frequency of 5800 mc. in the $\pi$ mode and has a bandwidth of 1200 mc. or 18.8%.

(II) The slow-wave structure of the first embodiment of the invention shown in FIG. 4

The slow-wave structure used in this experiment has a construction which applies the present invention to the slow-wave structure described in the previous paragraph I, wherein two short-circuit conductors are so inserted in the structure that they pass nearly through the center of the coupling slot at intervals of 22 mm. In the slow-wave structure having such a construction the resonant frequency in the 0 mode is 7800 mc. and that in the $\pi$ mode is 5850 mc. and has a bandwidth of 1950 mc. or 28.6%, and thus exhibits a considerably increased bandwidth over the prior art structure.

(III) The conventional slow-wave structure shown in FIG. 3

The slow-wave structure used in this experiment has a construction which includes a coupling loop in the coupling slot in the slow-wave structure described in the paragraph II above, said coupling loop being formed from a copper tape of 3 mm. width and 0.2 mm. thickness into an elliptical shape of 2.5 mm. minor diameter and 4 mm. major diameter. The conventional slow-wave structure having such construction has a resonant frequency of 7000 mc. in the 0 mode and a resonant frequency of 5200 mc. in the $\pi$ mode and has a bandwidth of 1800 mc. or 29.5%.

(IV) The slow-wave structure in the fourth embodiment of this invention shown in FIG. 7

The slow-wave structure used in this experiment has such a construction that two-short-circuit conductors are inserted, at 22 mm. intervals, in the slow-wave structure described in paragraph III above, each of said short-circuit conductors passing nearly through the center of a coupling slot. This experimental slow-wave structure of this invention has a resonant frequency of 7800 mc. in the 0 mode and a resonant frequency of 5200 mc. in the $\pi$ mode and has a bandwidth of 2600 mc. or 40.0% and thus exhibits a considerably large value which is almost equal to the bandwidth of a helix type slow-wave structure.

Although this invention has been described with reference to particular embodiments and experiments thereof, it is not to be so limited as changes and modifications can be made therein which are within the full intended scope of this invention. For instance, the number of the short circuit conductors can optionally be selected and also the section of said short-circuit conductor may be circular, elliptical, rectangular, polygonal, or other shape. A hollow cylindrical conductor can also be used.

By using a hollow cylindrical short-circuit conductor, the superior performance of the slow-wave structure of this invention can be further improved, as described below.

It is publicly known that the temperature of a slow-wave structure is raised with an increase in the output power of a travelling-wave tube, and accordingly, it is a very difficult problem to improve the heat radiation in a slow-wave structure when designing large output travelling-wave tubes. The hollow cylindrical short-circuit conductor solves this problem, as it has better heat radiation and can be utilized in a large output travelling-wave tube by passing a cooling medium, such as water, through the hollow cylindrical short-circuit conductor.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A broad band coupled cavity slow-wave structure of the backward wave type comprising a cylindrical waveguide, a plurality of spaced partition walls in said waveguide for defining a plurality of successively arranged cavities, said partition walls having a series of openings arranged in substantial aligned relationship with one another for the passage of an electron beam therethrough, each of said partition walls being provided with an arcuate coupling slot radially spaced from said concentrically curved about said openings, and short-circuit conductor means passing through each of said partition walls to short-circuit said walls alternatively in sequence.

2. The invention described in claim 1, further comprising:

an aperture in each partition wall at a position on the opposite side of said opening from said arcuate coupling slot, successive ones of said partition walls having their coupling slots positioned 180° with respect to each other, said short-circuit conductor means including a first conductor which passes alternately through the coupling slot and the aperture in successive ones of said partition walls, and a second conductor which passes alternately through the aperture and the coupling slot in successive ones of said partition walls, said first and second conductors being spaced from the sides of the coupling slots through which they pass.

3. A broad band coupled cavity slow-wave structure of the backward wave type comprising a cylindrical waveguide, a plurality of space partition walls in said waveguide for defining a plurality of successively arranged cavities, said partition walls having a series of holes in generally aligned relationship with one another for the passage of an electron beam therethrough, each of said partition walls being provided with at least one coupling loop extending with an elliptical curvature beyond opposite surfaces of the partition wall with which it is associated for a distance sufficient to couple the electromagnetic fields on both sides of the partition wall, and short-circuit conductor means passing through each of said partition walls to short-circuit said walls alternately in sequence.

References Cited

The following references, cited by the Examiner, are of record in the patented file of this patent or the original patent.

UNITED STATES PATENTS

| | | | |
|---|---|---|---|
| 3,015,750 | 1/1962 | Skowron et al. | 315—3.5 |
| 3,205,398 | 9/1965 | Allen et al. | 315—3.5 |
| 3,230,413 | 1/1966 | Chodorow | 315—3.5 |
| 3,233,139 | 2/1966 | Chodorow | 315—3.5 |
| 3,309,630 | 3/1967 | Hukunaga | 333—31 |

HERMAN K. SAALBACH, Primary Examiner

S. CHATMON, Jr., Assistant Examiner

U.S. Cl. X.R.

315—3.5